United States Patent
Anderson

(10) Patent No.: US 9,062,876 B2
(45) Date of Patent: Jun. 23, 2015

(54) GREEN SMR TO REFUEL HRSG DUCT BURNERS

(75) Inventor: Erik Anderson, Houston, TX (US)

(73) Assignee: Air Liquide Large Industries U.S. LP, Houston, TX (US)

( * ) Notice: Subject to any disclaimer, the term of this patent is extended or adjusted under 35 U.S.C. 154(b) by 1007 days.

(21) Appl. No.: 13/158,717

(22) Filed: Jun. 13, 2011

(65) Prior Publication Data
US 2012/0312018 A1    Dec. 13, 2012

(51) Int. Cl.
*F02C 6/18*    (2006.01)
*F22B 1/18*    (2006.01)

(52) U.S. Cl.
CPC ............. *F22B 1/1815* (2013.01); *Y02E 20/14* (2013.01); *Y02E 20/18* (2013.01); *Y02E 20/16* (2013.01)

(58) Field of Classification Search
CPC ........... Y02E 20/18; Y02E 20/16; F02C 3/28; F02C 3/30; F02C 3/20; F02C 3/22; F01K 23/10; F01K 23/106; F22B 1/1861; F22B 1/1815

USPC .................... 60/780, 39.182, 39.461, 39.464, 60/39.465; 122/7 R, 7 B
See application file for complete search history.

(56) References Cited

U.S. PATENT DOCUMENTS

| | | | |
|---|---|---|---|
| 2008/0132588 A1* | 6/2008 | Pedersen et al. | 518/711 |
| 2010/0037521 A1 | 2/2010 | Vakil et al. | |

* cited by examiner

*Primary Examiner* — Gerald L Sung
(74) *Attorney, Agent, or Firm* — Elwood L. Haynes

(57) ABSTRACT

An energy generation system including a primer mover producing a power output, and a combustion product outlet stream; and a steam generator wherein a water inlet stream and the combustion product outlet stream exchange heat to produce at least one steam outlet stream is provided. The steam generator further comprises at least one set of supplemental burners situated in the path of the combustion product outlet stream, and a hydrogen fuel inlet stream at least a portion of which is combusted in at least one of the supplemental burners or the prime mover.

1 Claim, 3 Drawing Sheets

GREEN SMR TO REFUEL HRSG DUCT BURNERS

BACKGROUND

Gas turbines are very commonly located at synthesis gas production sites. In this regard, commonly, the fuel for both the gas turbine and the hydrocarbon containing reactant fed for the synthesis gas production is natural gas. Where such installations exist, the gas turbines are not normally thermally linked to the synthesis gas production. In integrated gasification combined cycles, however, the gas turbine and the synthesis gas production are both thermally and operationally linked in that the fuel to the gas turbine is the synthesis gas and the synthesis gas is reheated through heat transfer with the synthesis gas stream being produced.

Cogeneration is the simultaneous production of both useful thermal energy (usually steam) and electrical energy from one source of fuel. Typically, one or more gas turbines are followed by a waste heat boiler using natural gas as fuel for both the turbines and to heat the exhaust gases from the turbines.

The steam generated by the heat recovery steam generator may be applied to an auxiliary steam turbine for generating additional torque, or applied to a using process which is capable of direct use of the steam without intermediate conversion to torque. The total output of a cogeneration system offers an attractive thermodynamic conversion efficiency.

In a combined cycle electric power generating plant employing one or more gas turbines and one or more steam turbines, the hot exhaust gas from each gas turbine is typically supplied to a boiler or steam generator for providing heat for producing the steam which drives the steam turbine or turbines. The various turbines drive one or more electric generators which produce electricity which is supplied by an electric utility system to various industrial, commercial and residential customers. In some combined cycle plants, further heat is supplied to the steam generator or generators by means of additional or supplemental burner mechanisms.

Supplementary firing the exhaust gas of gas turbines in front of HRSGs has been done for years to increase HRSG output. However, such firing tends to lower CC efficiency. More power is generated but at a lower overall CC efficiency due to the increasing dominance of the lower efficiency of the bottoming part of the cycle.

Synthesis gases, that is, gases that contain primarily hydrogen and carbon monoxide are produced by steam methane reforming, auto-thermal reforming, partial oxidation, either catalytic or non-catalytic. The resultant synthesis gas stream can be further processed in a water gas shift reactor to increase its hydrogen content and the hydrogen can be separated from the synthesis gas to produce a hydrogen product stream though pressure swing adsorption.

SUMMARY

The present invention is an energy generation system comprising a primer mover producing a power output, and a combustion product outlet stream; a steam generator wherein a water inlet stream and said combustion product outlet stream exchange heat to produce at least one steam outlet stream; said steam generator further comprising at least one set of supplemental burners situated in the path of said combustion product outlet stream, and a hydrogen fuel inlet stream at least a portion of which is combusted in at least one of said supplemental burners or said prime mover.

The present invention may also be a method of energy generation, comprising providing a first gas mixture; introducing said first gas mixture either into a pre-reformer followed by a primary reformer, or directly into a primary reformer, thereby generating a second gas mixture comprising hydrogen, carbon monoxide, carbon dioxide; introducing said second gas mixture into at least one isothermal shift reactor, or a combination of high followed by a low temperature shift reactor, or a medium temperature shift reactor, thereby generating a third gas mixture; introducing said third gas mixture into an amine wash, wherein said third gas is separated into a fourth gas mixture and a carbon dioxide enriched stream; introducing said fourth gas mixture into a standard H2 PSA unit, wherein said fourth gas is separated into a hydrogen enriched stream and a PSA purge gas stream; introducing said PSA purge gas stream as fuel into the reformer furnace along with natural gas, a portion of the feed hydrocarbon stream, or any other external supplemental fuel for the reformer furnace; providing a primer mover for producing a power output, and a combustion product outlet stream; providing a steam generator wherein a water inlet stream and said combustion product outlet stream exchange heat to produce at least one steam outlet stream; providing at least one set of supplemental burners within steam generator, situated in the path of said combustion product outlet stream, wherein said hydrogen enriched stream is combusted.

DESCRIPTION OF PREFERRED EMBODIMENTS

Figure 1:
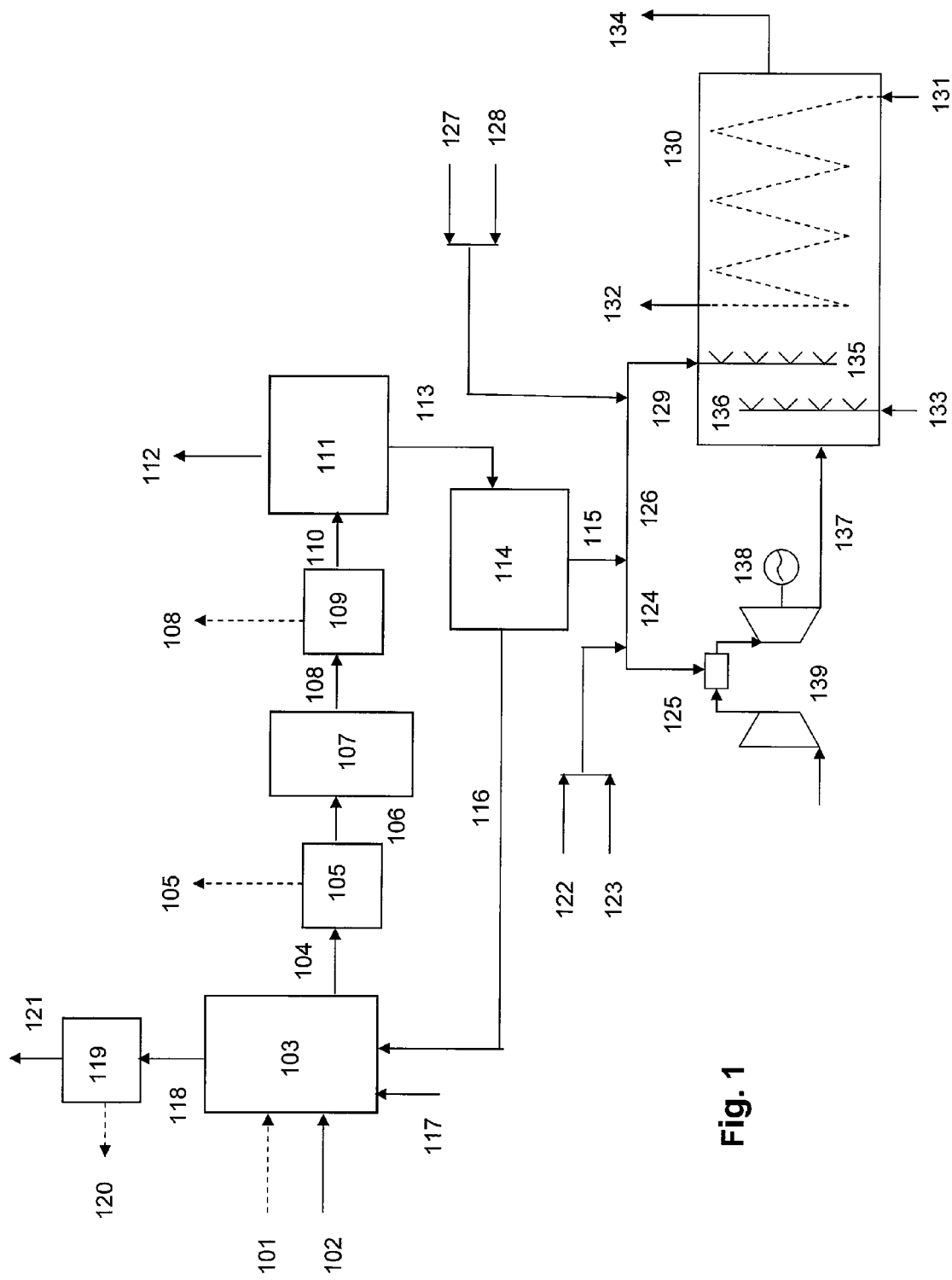
FIG. 1 is a schematic representation of one embodiment of the present invention.

Illustrative embodiments of the invention are described below. While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Turning now to FIG. 1 which illustrates one embodiment of the present invention, hydrocarbon stream 102 and steam stream 101 are introduced to pre-reformer followed by a novel primary reformer, or simply a novel primary reformer (both represented by 103), wherein a syngas stream 104 comprising at least carbon dioxide and hydrogen is produced. The reformer furnace flue gas 116 is cooled in waste heat recovery units 119 to generate steam 120, to preheat reformer feed streams, and residual flue gas 121. Syngas stream 104 is sent to a waste heat recovery unit 105 to recover steam 105. The exit of waste heat recovery, stream 106 is then introduced to a high temperature shift reactor followed by a low temperature shift reactor, or alternatively either an isothermal or a medium temperature shift reactor (symbolically represented by 107). This produces a carbon dioxide richer stream 108. Carbon dioxide richer stream 108 is further cooled in waste heat recovery unit 109 to generate steam 108, and a cooler syngas stream 110. Stream 110 is introduced into a CO2 recovery unit 111 to recover enriched CO2 stream 112 and sweet syngas stream 113. The sweet syngas stream 113 goes to a conventional PSA unit 114, wherein relatively pure hydrogen 115 is recovered, and residual stream 116 is sent to the primary reformer furnace as fuel. Additional supplemental fuel 117 may be added to the reformer furnace as required.

Relatively pure hydrogen 115 may be sent either to the prime mover 125 or the heat recovery steam generator 130 as at least a portion of the required fuel. The portion 124 that may be sent to the prime mover 125 may be combined with a hydrocarbon fuel stream 122 or a diluent stream 123, or both, to produce combined fuel stream 125. The portion 126 that may be sent to a first set of duct burners 135 in heat recovery steam generator 130 may be combined with a hydrocarbon fuel stream 127 or a diluent stream 128, or both, to produce combined fuel stream 129. The hydrocarbon fuel stream 122, 127 may be natural gas. The diluent stream 123, 128 may be nitrogen, carbon dioxide, recycled flue gas, steam, or air. If necessary, a second set of duct burners 136 may be situated in the heat recovery steam generator 130, and may be provided with an independent fuel stream. This independent fuel stream may be a hydrocarbon fuel stream, with or without a diluent, or any other available stream that has fuel value.

In one embodiment of the present invention, an energy generation system including a primer mover producing a power output, and a combustion product outlet stream; and a steam generator wherein a water inlet stream and said combustion product outlet stream exchange heat to produce at least one steam outlet stream is provided. The steam generator also includes at least one set of supplemental burners situated in the path of said combustion product outlet stream, and a hydrogen fuel inlet stream at least a portion of which is combusted in at least one of said supplemental burners or said prime mover.

In another embodiment of the current invention, an energy generation, including providing a first gas mixture; introducing the first gas mixture either into a pre-reformer followed by a primary reformer, or directly into a primary reformer, thereby generating a second gas mixture comprising hydrogen, carbon monoxide, carbon dioxide; introducing the second gas mixture into at least one isothermal shift reactor, or a combination of high followed by a low temperature shift reactor, or a medium temperature shift reactor, thereby generating a third gas mixture; introducing the third gas mixture into an amine wash, wherein the third gas is separated into a fourth gas mixture and a carbon dioxide enriched stream; introducing the fourth gas mixture into a standard H2 PSA unit, wherein the fourth gas is separated into a hydrogen enriched stream and a PSA purge gas stream; introducing the PSA purge gas stream as fuel into the reformer furnace along with natural gas, a portion of the feed hydrocarbon stream, or any other external supplemental fuel for the reformer furnace, providing a primer mover for producing a power output, and a combustion product outlet stream; providing a steam generator wherein a water inlet stream and the combustion product outlet stream exchange heat to produce at least one steam outlet stream; providing at least one set of supplemental burners within steam generator, situated in the path of the combustion product outlet stream, wherein the hydrogen enriched stream is combusted is provided.

The prime mover may be any machine that transforms energy from thermal, electrical or pressure form to mechanical form; typically an engine or a combustion turbine. The invention may also include a hydrocarbon fuel stream, wherein the hydrogen fuel inlet stream and the hydrocarbon fuel stream are blended and then combusted in at least one of the supplemental burners or the prime mover. The steam generator may also include a first set of supplemental burners and a second set of supplemental burners.

Figure 2:
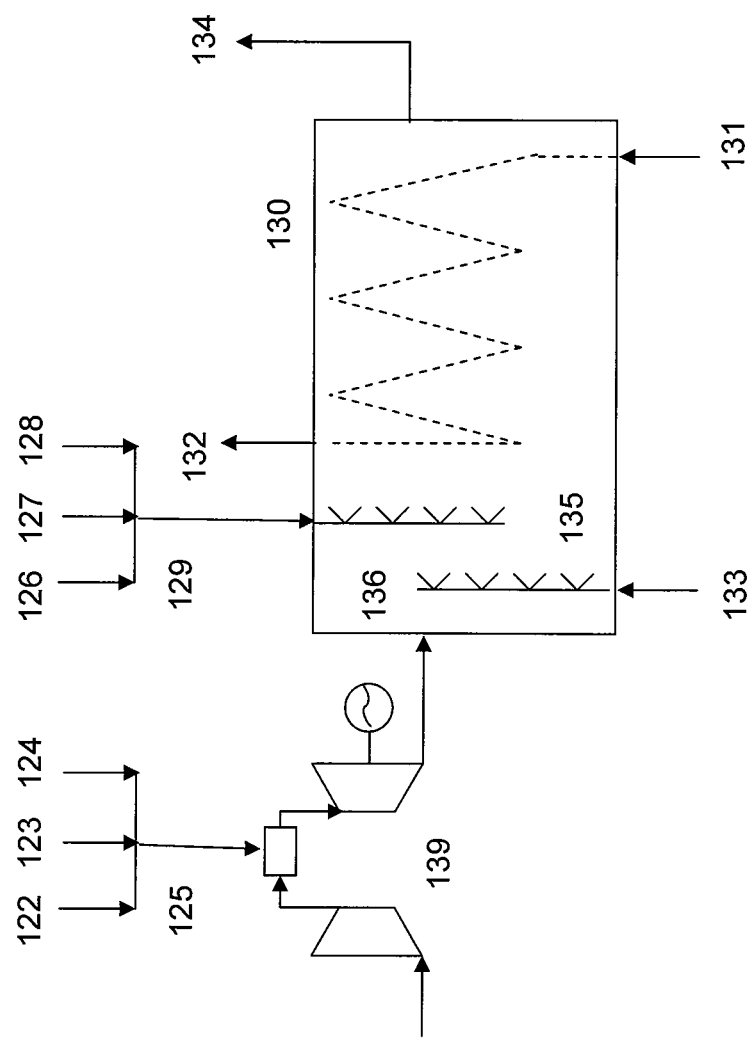
FIG. 2 is a schematic representation of sequential duct burner arrangement, in accordance with one embodiment of the present invention.
Figure 3:
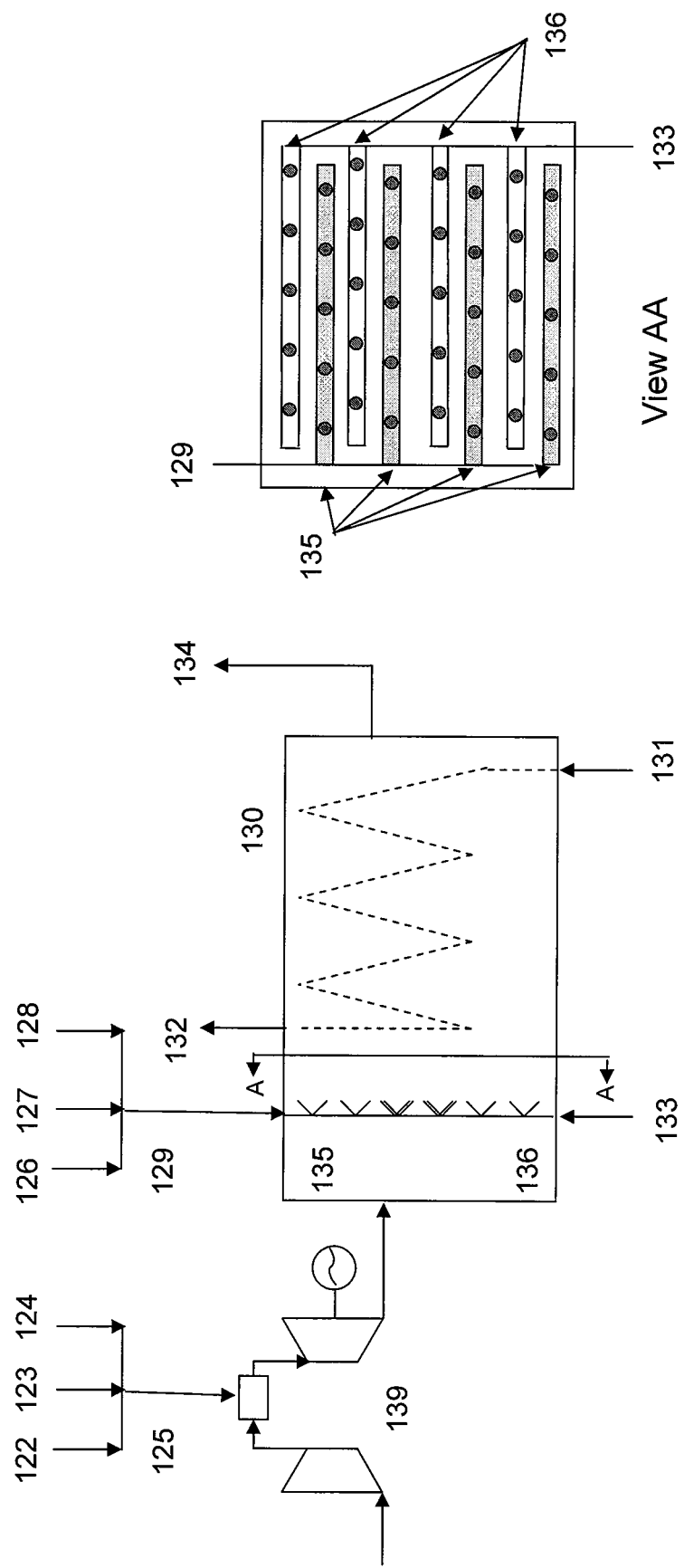
FIG. 3 is a schematic representation of coincidental duct burner arrangement, in accordance with one embodiment of the present invention.

In another embodiment of the current invention, the energy generation system may also include a diluent stream, wherein the hydrogen fuel inlet stream and the diluent stream are blended and then introduced into at least one of the supplemental burners or the prime mover. The diluent may be nitrogen, carbon dioxide, recycled flue gas, steam, or air. The said steam generator may also include a first set of supplemental burners and a second set of supplemental burners, wherein the first set of supplemental burners may combust the blended hydrogen fuel inlet and diluent stream, and the second set of supplemental burners may combust a hydrocarbon fuel inlet stream. The first set of supplemental burners and the second set of supplemental burners may be sequentially arranged in the path of the combustion product outlet stream (as indicated in FIG. 1 and FIG. 2). The first set of supplemental burners and the second set of supplemental burners may be coextensively arranged in the path of the combustion product outlet stream (as indicated in FIG. 3). The energy generation system may also include a diluent stream and a hydrocarbon fuel stream, wherein the hydrogen fuel inlet stream and the diluent stream may be blended to produce a first blended stream, and the hydrogen fuel inlet stream and the hydrocarbon fuel stream may be blended to produce a second blended stream.

In another embodiment of the current invention, the energy generation system, the first blended stream may be introduced into at least one of the supplemental burners or the prime mover and the second blended stream may be combusted in the remaining of the supplemental burners or said prime mover. The steam generator may also include a first set of supplemental burners and a second set of supplemental burners, wherein the first set of supplemental burners combusts at least part of the first blended stream, and the second set of supplemental burners combusts at least part of the second blended stream. The first set of supplemental burners and the second set of supplemental burners may be sequentially arranged in the path of said combustion product outlet stream. The first set of supplemental burners and the second set of supplemental burners may be coextensively arranged in the path of the combustion product outlet stream In another embodiment of the current invention, the energy generation system may include a first set of supplemental burners and a second set of supplemental burners, wherein the first set of supplemental burner's combusts the hydrogen fuel inlet stream, and the second set of supplemental burners combusts a hydrocarbon fuel inlet stream. The first set of supplemental burners and the second set of supplemental burners may be sequentially arranged in the path of the combustion product outlet stream. The first set of supplemental burners and the second set of supplemental burners may be coextensively arranged in the path of the combustion product outlet stream.

In another embodiment of the current invention, an energy generation, including providing a first gas mixture; introducing the first gas mixture either into a pre-reformer followed by a primary reformer, or directly into a primary reformer, thereby generating a second gas mixture comprising hydrogen, carbon monoxide, carbon dioxide; introducing the second gas mixture into at least one isothermal shift reactor, or a combination of high followed by a low temperature shift reactor, or a medium temperature shift reactor, thereby generating a third gas mixture; introducing the third gas mixture into an amine wash, wherein the third gas is separated into a fourth gas mixture and a carbon dioxide enriched stream; introducing the fourth gas mixture into a standard H2 PSA unit, wherein the fourth gas is separated into a hydrogen enriched stream and a PSA purge gas stream; introducing the PSA purge gas stream as fuel into the reformer furnace along with natural gas, a portion of the feed hydrocarbon stream, or any other external supplemental fuel for the reformer furnace, providing a primer mover for producing a power output, and a combustion product outlet stream; providing a steam generator wherein a water inlet stream and the combustion product outlet stream exchange heat to produce at least one steam outlet stream; providing at least one set of supplemental burners within steam generator, situated in the path of the combustion product outlet stream, wherein the hydrogen enriched stream is combusted is provided.

Turning now to FIG. 1 which illustrates one embodiment of the present invention, hydrocarbon stream 102 and steam stream 101 are introduced to pre-reformer followed by a novel primary reformer, or simply a novel primary reformer (both represented by 103), wherein a syngas stream 104 comprising at least carbon dioxide and hydrogen is produced. The reformer furnace flue gas 116 is cooled in waste heat recovery units 119 to generate steam 120, to preheat reformer feed streams, and residual flue gas 121. Syngas stream 104 is sent to a waste heat recovery unit 105 to recover steam 105. The exit of waste heat recovery, stream 106 is then introduced to a high temperature shift reactor followed by a low temperature shift reactor, or alternatively either an isothermal or a medium temperature shift reactor (symbolically represented by 107). This produces a carbon dioxide richer stream 108. Carbon dioxide richer stream 108 is further cooled in waste heat recovery unit 109 to generate steam 108, and a cooler syngas stream 110. Stream 110 is introduced into a CO2 recovery unit 111 to recover enriched CO2 stream 112 and sweet syngas stream 113. The sweet syngas stream 113 goes to a conventional PSA unit 114, wherein relatively pure hydrogen 115 is recovered, and residual stream 116 is sent to the primary reformer furnace as fuel. Additional supplemental fuel 117 may be added to the reformer furnace as required.

Relatively pure hydrogen 115 may be sent either to the prime mover 139 or heat recovery steam generator 130 as at least a portion of the required fuel. The portion 124 that may be sent to the prime mover 139 may be combined with a hydrocarbon fuel stream 122 or a diluent stream 123, or both, to produce combined fuel stream 125. The prime mover 139 combusts the fuel stream 125, which may be relatively pure hydrogen, a hydrocarbon fuel stream, or a combination of either with or without the addition of the diluent, and thereby generates a power output 138 and a combustion product outlet stream 137. Combustion product outlet stream 137 is directed into heat recovery steam generator 130, wherein in passes at least one set of duct burners 135, 136.

The portion 126 of the relatively pure hydrogen stream 115 that of may be sent to a first set of duct burners 135 in heat recovery steam generator 130 may be combined with a hydrocarbon fuel stream 127 or a diluent stream 128, or both, to produce combined fuel stream 129. The hydrocarbon fuel stream 122, 127 may be natural gas. The diluent stream 123, 128 may be nitrogen, carbon dioxide, recycled flue gas, steam, or air. If necessary, a second set of duct burners 136 may be situated in the heat recovery steam generator 130, and may be provided with an independent fuel stream. This independent fuel stream may be a hydrocarbon fuel stream, with or without a diluent, or any other available stream that has fuel value.

As the combustion product outlet stream 137 passes through the heat recovery steam generator 130, during which time the duct burners 135, 136 may be introducing supplemental heat into the stream, at least one water inlet stream 131 is simultaneously introduced to the heat recovery steam generator 130, which indirectly exchanges heat with the hot combustion gas stream, thereby producing at least one steam outlet stream 132 and a flue gas stream 134 that exits the heat recovery steam generator 130.

An exemplary, non-limiting embodiment of a novel hydrogen plant that can be used with various embodiments of the present invention is disclosed in published US application number 20100037521, the contents of which are hereby incorporated by reference as if they were presented herein in their entirety.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method of energy generation, comprising a) providing a first gas mixture; b) introducing said first gas mixture either into a pre-reformer followed by a primary reformer, or directly into a primary reformer, thereby generating a second gas mixture comprising hydrogen, carbon monoxide, carbon dioxide; c) introducing said second gas mixture into at least one isothermal shift reactor, or a combination of high followed by a low temperature shift reactor, or a medium temperature shift reactor, thereby generating a third gas mixture; d) introducing said third gas mixture into an amine wash, wherein said third gas is separated into a fourth gas mixture and a carbon dioxide enriched stream; e) introducing said fourth gas mixture into a H2 PSA unit, wherein said fourth gas is separated into a hydrogen enriched stream and a PSA purge gas stream; f) introducing said PSA purge gas stream as fuel into a reformer furnace along with natural gas, a portion of the feed hydrocarbon stream, or any other external supplemental fuel for the reformer furnace; g) providing a primer mover for producing a power output, and a combustion product outlet stream; h) providing a steam generator wherein a water inlet stream and said combustion product outlet stream exchange heat to produce at least one steam outlet stream; i) providing at least one set of supplemental burners within steam generator, situated in the path of said combustion product outlet stream, wherein said hydrogen enriched stream is combusted.

* * * * *